INVENTOR
JOSEPH H. HENDERSON

ATTORNEY

United States Patent Office 3,541,807
Patented Nov. 24, 1970

3,541,807
AIR DRYING DEVICE
Joseph H. Henderson, 5400 McDermott Drive,
Berkeley, Ill. 60163
Filed Sept. 5, 1968, Ser. No. 757,588
Int. Cl. F25d 23/12
U.S. Cl. 62—272                                    2 Claims

ABSTRACT OF THE DISCLOSURE

An improved air drying unit characterized by a shell having an inlet and an outlet port, an integral air retempering, cooling and demisting unit in the shell comprised of juxtaposed first and second high conductivity heat exchangers and a demister juxtaposed to the second heat exchanger. The integral unit is supported in the shell by upper and lower walls secured to the interior of said shell and to the first heat exchanger to form a barrier whereby entrant air must pass through the first and second heat exchangers. A second upper wall is secured to the interior of said shell and to the upper portion of the demister to define with the first upper wall an outlet chamber for retempered air which has moved past the first heat exchanger. The second upper wall and the lower wall form a second chamber for circulation therethrough of air which has been cooled below its dew-point and separated of its water in the demister, and into the first heat exchanger for retempering of the air prior to moving to the outlet chamber. The second chamber has a valve at the bottom for controllably discharging the water dropping from the demister to the bottom of the second chamber.

---

Figure 1:
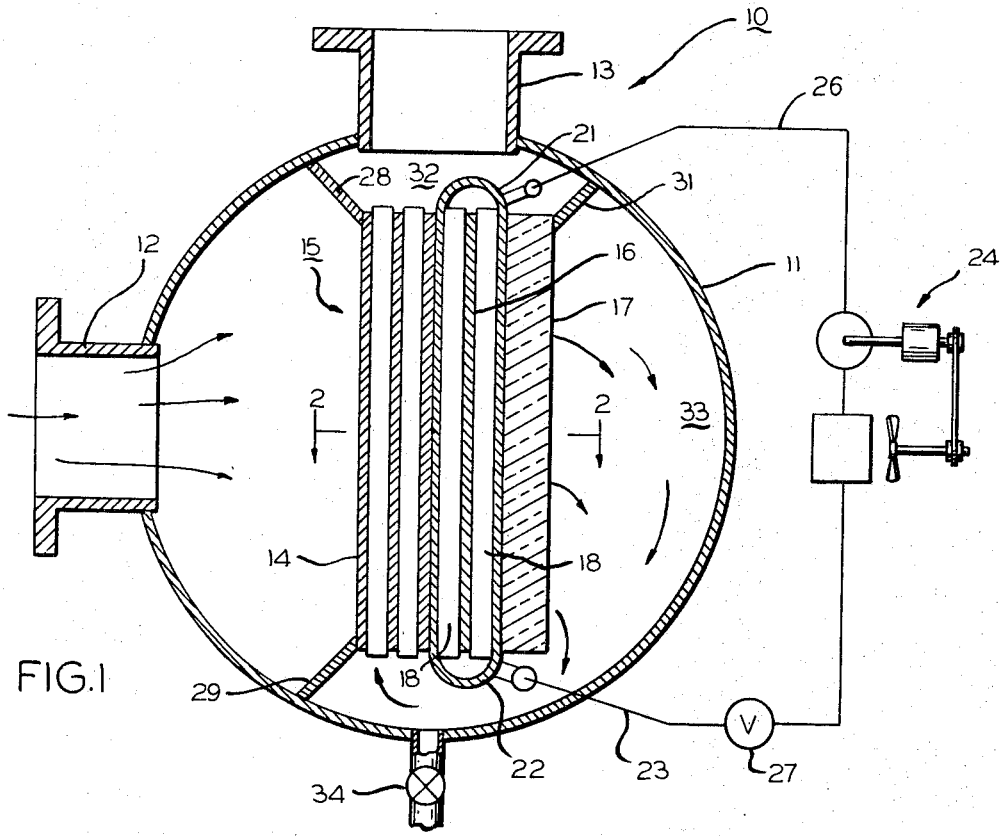

The structure according to the present invention finds particular application in industrial plants requiring large quantities of compressed air which must be completely dry. By reason of the structure herein disclosed it is possible to provide complete drying of the air in a space a great deal smaller than that required for conventional kinds of equipment.

With the foregoing considerations in mind it is a principal object of the invention to provide a highly efficient air drying structure occupying but a fraction of the space required by conventional structures.

Another object is to provide an air dryer contained within a single shell having a unitized air drying unit therein and consisting of first and second high conductivity juxtaposed heat exchangers and a demister juxtaposed to the second heat exchanger, the air drying unit being supported in the shell so as to provide a chamber for circulation of entrant air to the heat exchangers and the demister, an outlet chamber for retempered air, and a further chamber for circulating air cooled below its dew-point and separated from its moisture through the first heat exchanger for retempering thereof.

Figure 2:
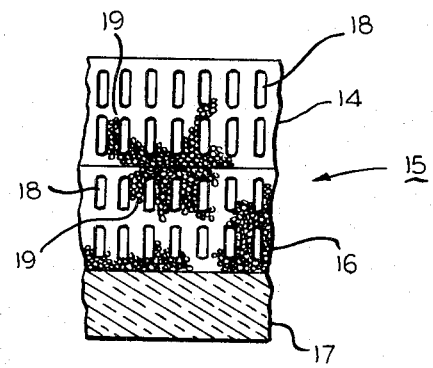

In the drawing:

FIG. 1 is a sectional view through an air drying apparatus embodying the principles according to the present invention; and FIG. 2 is a sectional view taken along the line 2—2 of FIG. 1 looking in the direction of the arrows.

The improved air dryer according to the present invention is denoted by the reference numeral 10 and comprises a cylindrical shell 11 which may be mounted on a support frame, not shown. Shell 11 has an inlet port 12 connected to a source of compressed air to be dried, and an outlet port 13 for the dried air.

Structure is provided for retempering, cooling and demisting air introduced to the shell 11 at the inlet port 12, and consists of an integral unit 15 having a first high conductivity heat exchanger 14 for entrant air in heat exchange relationship with air which has been dried and cooled below its dew-point, so as to retemper the air by the air entrant at the inlet port 12.

Heat exchanger 14 is in juxtaposition with a second high conductivity heat exchanger 16, and the latter is in juxtaposition with a demister 17, which detrains moisture from air which has been cooled below its dew-point in heat exchanger 16.

Both of the heat exchangers 14 and 16 are of the same general type and each is composed of long flattened copper tubes 18 supported in a matrix of small copper shot 19 sintered together and also sintered to the walls of the tubes 18. A typical section through the heat exchangers 14 and 16 is shown in FIG. 2, and they may be arranged in banks of desired thickness, and extending for the length of the shell 11.

The second heat exchanger 16 is substantially like heat exchanger 14, but is arranged with upper and lower headers 21 and 22. Gaseous refrigerant is introduced to the lower header 22 by a supply pipe 23 connected to a motor-compressor-condenser unit 24, and moves upward through the tubes 18 of heat exchanger 16 to the header 21, whence the heated and expanded refrigerant exits via a return line 26 to return to unit 24. An expansion valve 27 in line 23 controls the admission of refrigerant to heat exchanger 16.

Structure is provided for supporting the unit 15 in such a fashion as to provide a barrier whereby the entrant air at port 12 is required to pass through the unit 15. To this end the unit 15 is supported by an upper wall 28 secured to the inner side of shell 11 and to the upper end of first heat exchanger 14 and by a lower wall 29 secured to the inner side of shell 11 and to the lower end of first heat exchanger 14. The upper and lower walls 28 and 29 extend for the length of shell 11.

The unit 15 is additionally supported by a second upper wall 31 secured to the inner of shell 11 and to the upper end of the demister 17. The second upper wall 31 and the lower wall 29 form a second chamber 33 for circulation therethrough of air which has moved from the inlet port 12 through first and second heat exchangers 14 and 16 and cooled below its dew-point in heat exchanger 16, and separated of its entrained water in demister 17.

The air so cooled and separated of its entrained water moves through the tubes 18 of first heat exchanger 14 to be retempered by the air moving from inlet port 12 and past first heat exchanger 14.

Structure is provided for removing water dropping from demister 17 from the interior of shell 11, and to this end the bottom of shell 11 is provided with valve means 34 which controllably discharges the water from demister 17.

Both heat exchangers 14 and 16 have extremely high K factors, of the order of about 222, so that very effective heat transfer takes place at each, all with very compact components.

I claim:

1. In an improved air drying unit, a shell having an inlet port for humid air, an outlet port for dry air at a temperature above the dew-point, means within said shell for tempering, cooling and demisting air, said last named means including support means for supporting the same as an integral unit and consisting of a first high conductivity heat exchanger for entrant air in heat exchange relationship with air which has been dryed and cooled below its dew-point; a second high conductivity heat exchanger in juxtaposition with said first heat exchanger for entrant air which has moved past said first heat exchanger and moves through said second heat exchanger in heat exchange relationship with an expanded refrigerant to lower the temperature of said entrant air in said second heat exchanger below its dew-point; a demister in juxtaposition with said second heat exchanger and adapted to pass therethrough air which has been cooled below its dew-point, means in said demister for separating water from such air; the improvement in such air drying unit wherein said support means comprises upper and lower walls secured to the interior of said shell and to said first heat exchanger to form a barrier whereby said humid air must pass through said first and second heat exchangers and said demister, a second upper wall secured to the interior of said shell and secured to the upper portion of said demister to provide with the first named upper wall a barrier and an outlet chamber connected to said outlet for retempered air which has moved past said first heat exchanger, said second upper wall and said lower wall forming a second chamber for circulation therethrough of air which has been cooled below its dew-point and separated of its water in said demister and into said first heat exchanger for retempering thereof prior to moving to said outlet port.

2. In an air drying unit according to claim 1 wherein said shell is provided with valve means at the bottom thereof to discharge controllably the water separated in said demister.

References Cited

UNITED STATES PATENTS

| | | | |
|---|---|---|---|
| 2,237,332 | 4/1941 | Bretzlaff | 62—90 |
| 2,522,484 | 9/1950 | Ringquist | 62—90 |
| 2,682,758 | 7/1954 | Harris | 62—428 |
| 2,829,505 | 4/1958 | Oates | 62—93 |

WILLIAM J. WYE, Primary Examiner

U.S. Cl. X.R.

62—90, 93, 428